United States Patent [19]
Barker et al.

[11] Patent Number: 5,317,764
[45] Date of Patent: Jun. 7, 1994

[54] WASTE COLLECTION AND DISPOSAL DEVICE

[76] Inventors: Joel A. Barker, 8311 Windbreak Trail, Lake Elmo, Minn. 55042; Paul H. Nahurski, 1954 Berkeley Ave., Saint Paul, Minn. 55105

[21] Appl. No.: 711,257

[22] Filed: Jun. 4, 1991

Related U.S. Application Data

[63] Continuation of Ser. No. 395,754, Aug. 18, 1989, abandoned.

[51] Int. Cl.⁵ .............................................. A47K 11/02
[52] U.S. Cl. .............................................. 4/449; 4/479
[58] Field of Search ............ 4/449, 479, 482, DIG. 9, 4/DIG. 19, 489, 481, 144.1, 467, 461, 469, 315, 319, 342, 340; 128/762, 767, 760; 604/348, 349, 350, 351, 353, 355, 356

[56] References Cited

U.S. PATENT DOCUMENTS

| | | | |
|---|---|---|---|
| 657,103 | 9/1900 | Hackenberg | 4/484 |
| 2,067,958 | 1/1937 | Wallace | 4/484 |
| 3,937,213 | 2/1976 | McDonald | 128/762 |

Primary Examiner—Henry J. Recla
Assistant Examiner—David J. Walczak
Attorney, Agent, or Firm—Friederichs Law Firm

[57] ABSTRACT

A human waste apparatus is disclosed which includes mechanism for removing a cup-like container from a stack of containers, mechanism for moving the container to a use station and mechanism for moving the used container to a storage position where the container is sealed.

7 Claims, 6 Drawing Sheets

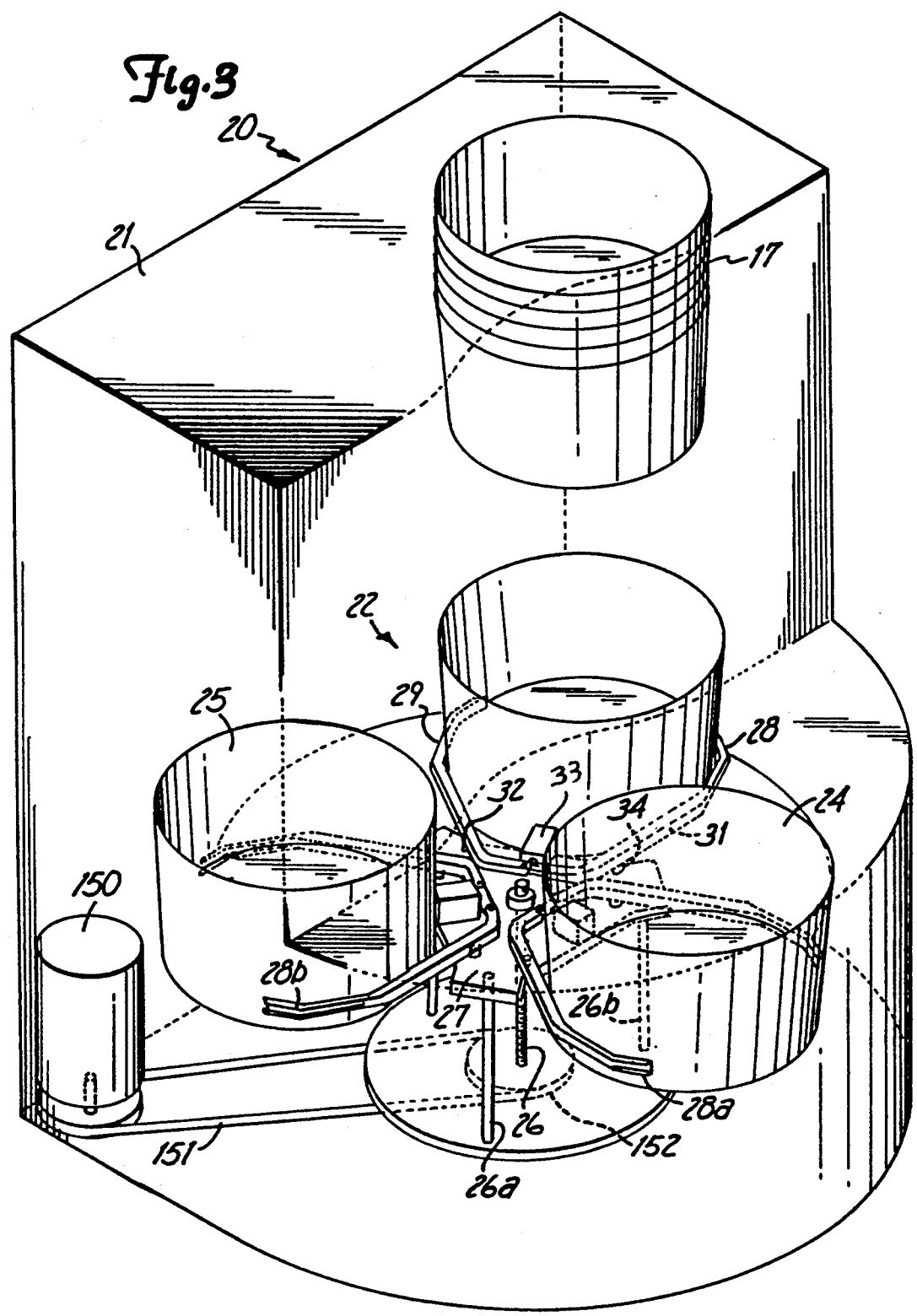

WASTE COLLECTION AND DISPOSAL DEVICE

This is a continuation of application Ser. No. 07/395,754, filed Aug. 18, 1989 now abandoned.

FIELD OF THE INVENTION

The present invention relates to waste disposal and more particularly to a device for collecting, storing, and disposal of human waste and fecal matter.

BACKGROUND OF THE INVENTION

The collection and disposal of human waste matter has been a problem of long standing. Early illustration of attempts at solving this problem is found in the Aqueducts, perhaps 3,000 years ago or more. Our solutions today are not much different than those of the Aqueducts.

The ducts that carry sewage are now enclosed and in the form of pipes with treatment plants processing the sewage to reduce incidence of disease. Large amounts of fresh water is consumed in our present transportation of human waste through the pipes and enclosed aqueducts. This is true even in geographical areas where there are major water shortages.

Prior attempts to eliminate the pipe and aqueduct conveyance of human waste have not been successful. Chemical toilets have been available for many years in which human waste is collected in plastic bags containing deodorant and antiseptic chemical compositions. Such chemical toilets have required individual handling of the plastic bags. A plastic bag is generally used several times, thus leaving the waste and fecal matter exposed between uses. Disposal of the plastic bag has not been satisfactory. For example, a twist tie may enclose the bag. The bag may then be discarded in a suitable location. Generally garbage collection has not been deemed a suitable disposal because of possible transmission of disease. Thus one is confronted with finding a suitable disposal location. This may be a pit in which the bag is deposited and covered. Many geographical locations, particularly within metropolitan areas have laws preventing such action. The chemical toilet of this type has not been considered a suitable solution. The present invention uses containers rather than water as the conveyor of the human waste.

SUMMARY OF THE PRESENT INVENTION

The present invention provides a hygienic system for the collecting and disposal of human waste and fecal matter. The present invention includes the method of collecting the human waste and fecal matter in a formed, cup-like structure, e.g. container, which is subsequently sealed and stacked. The stacked series of containers is transported to a processing plant where it is pathologically and biologically treated. Pathological organisms are killed off and non-pathological organisms, e.g. humus producing bacteria are added. The waste and fecal matter is converted into humus which may be used as media for growing agricultural plants.

The apparatus of the present invention may include mechanism for receiving a stacked series of unused containers, mechanism for sequentially transporting one of said containers to a "use" station or position where the container is stored pending deposit of a batch of human waste and fecal matter, mechanism for transporting the container with waste and fecal matter to a station or location for enclosure and storage of such container, and mechanism for stacking in a storage configuration a series of such sealed waste and fecal matter containers.

The apparatus may include a housing having a pleasing aesthetic appearance such as of china, wood or a polymeric material. Any of a wide variety of shapes and colors may be provided. The apparatus may include a comfortable seat or human support portion.

The transporting mechanism may include a device for unstacking the container from the stacked series and for example a turntable or a linear structure for moving the container into the use position.

The mechanism for stacking and sealing may act to move the container beneath and upwardly into engagement with the preceding container. The sealing may be accomplished by any suitable adhesive material e.g. a contact adhesive.

The present apparatus may have a reciprocating needle for inserting through the wall or bottom of the container to withdraw liquid waste. This apparatus may be used for taking urine samples.

The apparatus may be driven in any of a variety of ways. For example, in remote locations the apparatus may be mechanically driven with a lever or crank. In recreational vehicles the apparatus may be driven by a battery powered electric motor. The apparatus designed for residential use may be powered by a motor using household electric power.

IN THE DRAWINGS

FIG. 3 shows perspective view, partially in phantom, of a preferred embodiment of the present invention with a rotary or turntable mechanism for transporting the containers;

DETAILED DESCRIPTION OF THE INVENTION

Figure 1:
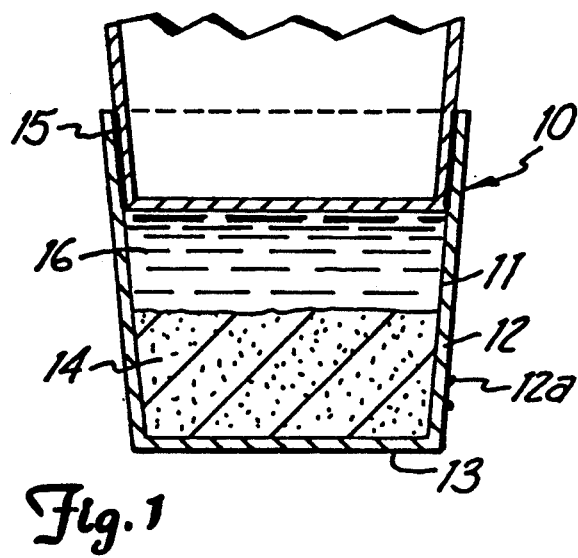
FIG. 1 is a cross-sectional view of a sealed container including waste and fecal matter.
Figure 2:
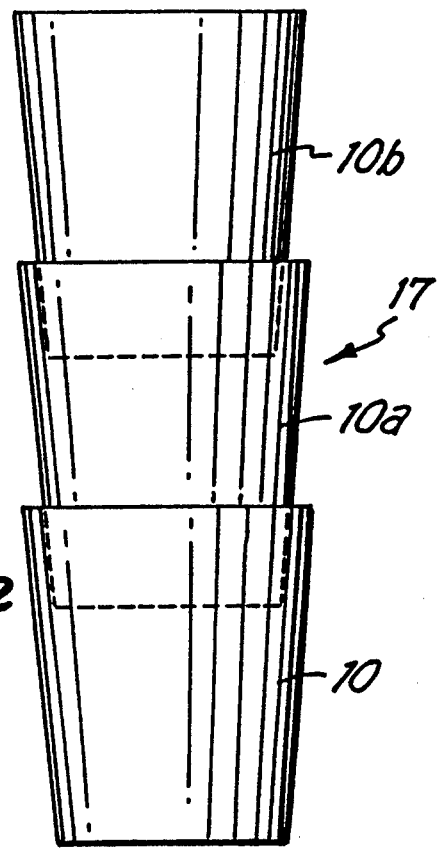
FIG. 2 shows a stack of sealed containers.

The present invention contemplates the collection and storage of human waste and fecal matter in sealed containers 10 as illustrated in FIG. 1.

Container 10 includes a cup-like portion 11 which may be of a biodegradable cardboard or polymeric material. The cup-like portion 11 includes a frustoconical portion 12 with an integral bottom 13. The container 10 may include a zone of adhesive 15 which serves to seal adjacent containers 10 as hereinafter described. The adhesive 15 may be a coating on the outer portion of the container 10. Alternatively, the container 10 may have ribs 12a extending around the portion 12 with an adhesive coating on the ribs 12a. While the container 10 is shown as being frustoconical in shape, various other shapes may be used e.g. a tapered trapezoidal shape or an oval shape.

In use, the waste and fecal material 14 is deposited in the cup-like container. The cleansing tissue 16 may then be deposited, superimposed above the fecal matter. The cleansing tissue 16 serves a second purpose in that it absorbs and stabilizes fluid waste material in the container. If desired, hygienic wet wipes may be provided. A plurality of such containers, e.g. 10, 10a and 10b may be sequentially sealed within each other providing a column 17.

The container may then be sealed by insertion of the second container 10a upwardly into engagement with a first container 10b providing sealing engagement therebetween. The cups 10-10b may be sealed by adhesive 15. The column may be disposed of in a suitable manner such as by treatment in a plant to provide humus.

Suitable apparatus 20 for manipulation of the waste disposal containers 10 is illustrated in FIGS. 3-6. The apparatus 20 includes a housing 21 which supports a turntable 22. The housing 21 shown in phantom may further be of a construction suitable for support of a human being during use. The housing 21 may for example be constructed of any suitable polymeric material, china or wood.

The turntable 22 may include a central shaft 26 which supports a plate 27 at the upper end thereof. The plate 27 may also be supported and aligned by sliding columns 26a and 26b. The plate 27 caries three caliper-like devices 28, 28a and 28b for securing and transporting containers 12. Each of the three caliper-like devices 28, 28a and 28b may be identical in construction and therefore only device 28 is described.

Caliper 28 (FIGS. 3 and 4), for example, includes a pair of fingers 29 and 31. Finger 29 is pivotably supported by pin 32 with respect to plate 27. Finger 31 is likewise pivotably supported to plate 27 by pin 34. The Fingers 29 and 31 are normally closed e.g. biased toward each other, such as by a coil spring wrapped around pins 32 and 34, respectively. The fingers 29 and 31 are pivotally driven apart by a solenoid 33. The solenoid 33 is mounted on plate 27 and has a reciprocating piston 33a. A cross member 35 is mounted on the outer end of piston 33a. The cross member 35 is pivotally secured at either end to the fingers 29 and 31 respectively such as by pins 37 and 38. The solenoid 33 may be suitably controlled by a programed timing mechanism (not shown).

Figure 5:
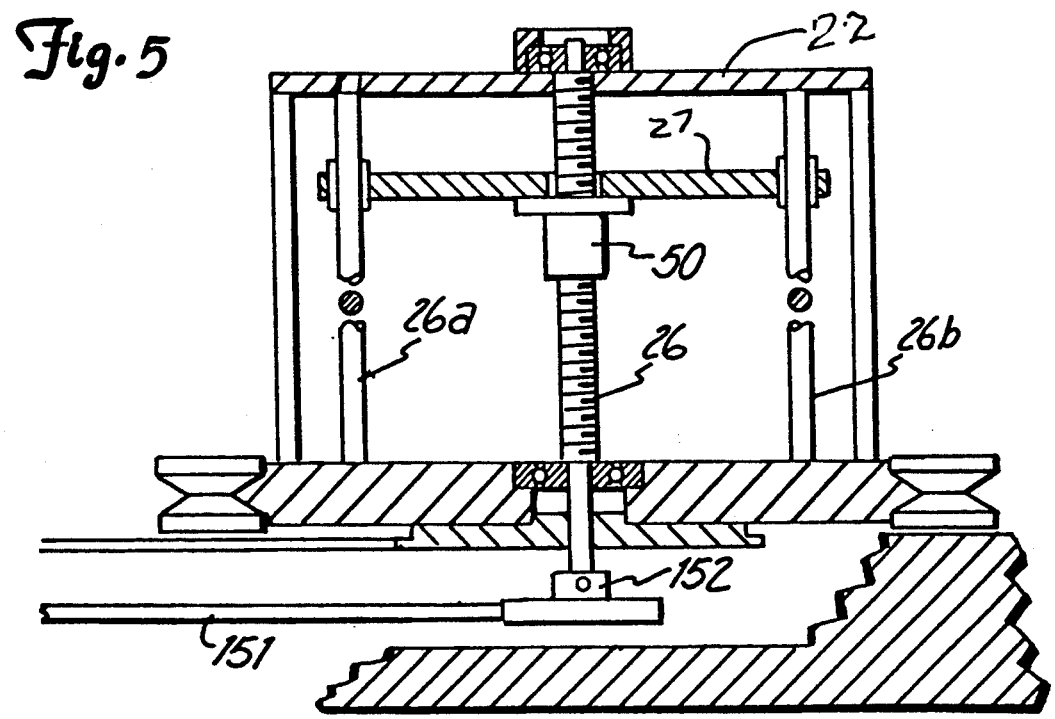
FIG. 5 is a sectional view taken along the line 5—5 in FIG. 4.
Figure 4:
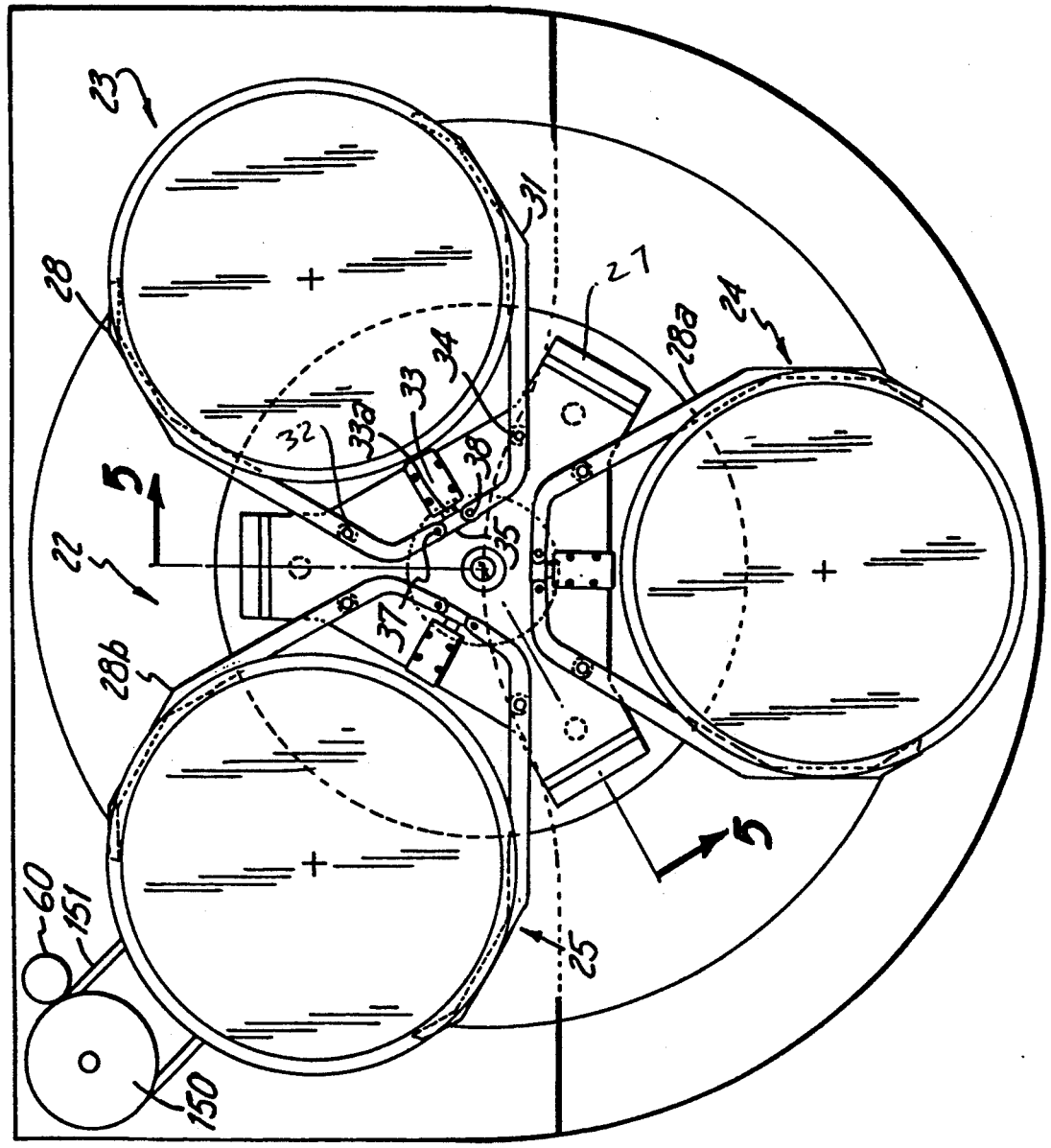
FIG. 4 is a top plan view of the embodiment shown in FIG. 3.
Figure 8:
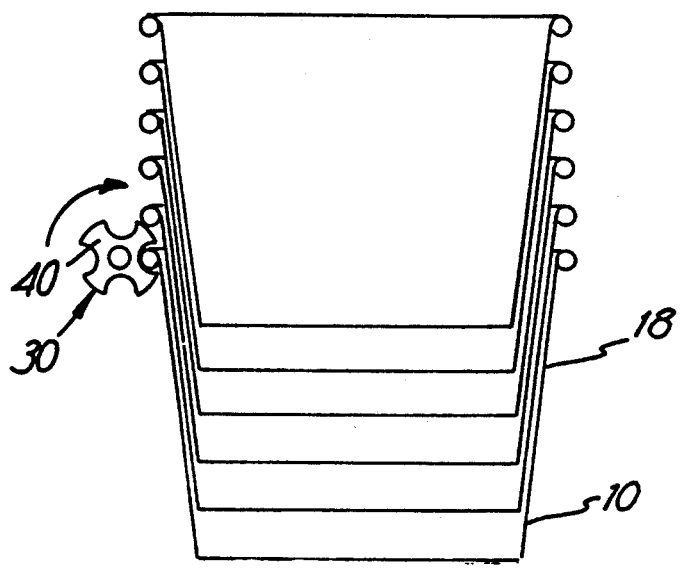
FIG. 8 is a view of a ratchet or denestor device for holding and sequentially releasing a container on demand.

The apparatus 20 may include mechanism e.g. denestor 30 for placement of individual containers 12 into the caliper 28 as illustrated in FIG. 5 and 8. The mechanism 30 may include a driven notched wheel 40 which supports the column of cups above the station 23. When demand is made for a new cup, the denestor wheel 40 rotates sufficient to release the lowermost cup in the column 18. The plate 27 and central shaft 26 are supported by a ball screw 50 which serve to raise and lower the plate 27. In other words, the ball screw 50 moves the plate 27 downwardly once a container is released into caliper 28 thus permitting the container to clear the stack as the table is rotated.

Figure 9:
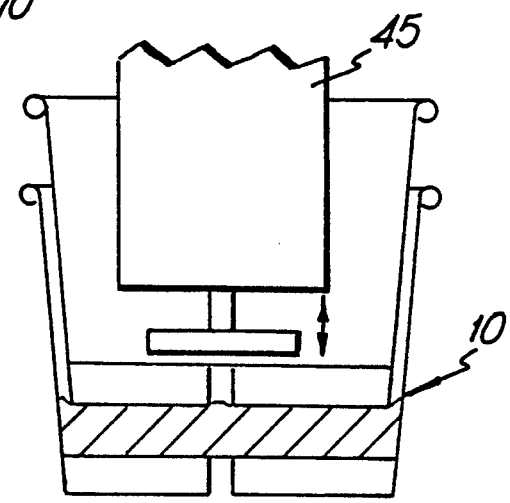
FIG. 9 is a schematic view of a load cell for use in stacking adjacent used containers.

FIG. 9 illustrates used containers stacked upwardly to nest in the preceding container. This may further include a load cell 45 for applying force downwardly on the uppermost cup, such force being of a predetermined amount appropriate for assuring sealing of the adjacent containers.

Figure 11:
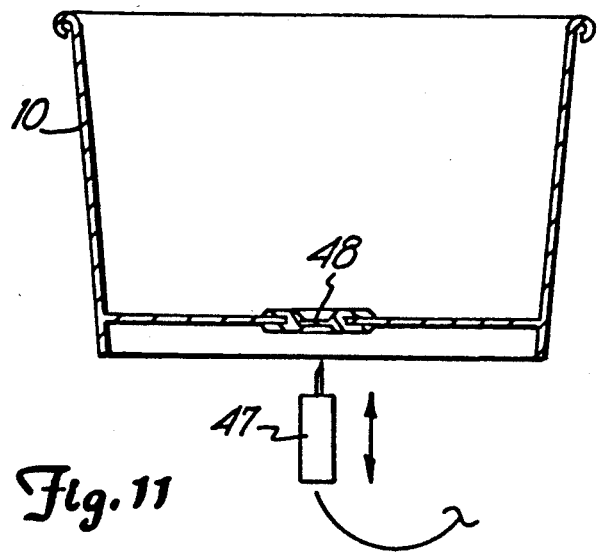
FIG. 11 shows a schematic view of a needle for removal of fluid material from the container.
Figure 10:
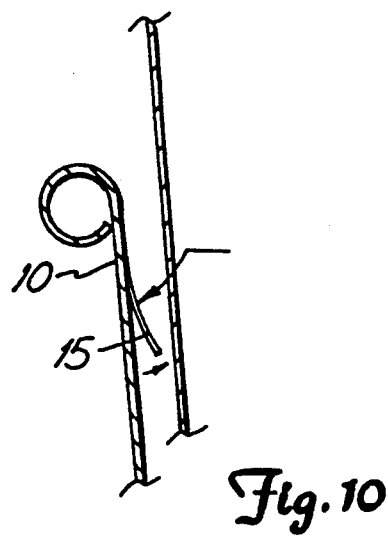
FIG. 10 is an enlarged portion of a container including a heat sealable material, e.g. polyolefin material.

The device 20 FIG. 11 may further include mechanism 47 for draining fluid from the containers. For example, the draining device may include a reciprocating needle that extends into the cup-like container drawing off any fluid present. The container may have a self-sealing membrane 48 through which the needle 47 moves.

The turntable 22 provides a plurality of stations such as 23, 24 and 25. Station 23 receives a container 12 from a stack of containers 18. The plate 27 then moves downwardly and rotates so that the container 10 is positioned at the station 24. The turntable then is moved upwardly in station 24 to a position where the container 10 is used for depositing the waste and fecal matter. Air evacuation means 60 (FIG. 4) may be used to remove ambient air from around the container 10 following depositing of fecal matter. The turntable then rotates to station 25 where the container 10 is sealed and may be attached to a column of like containers 17.

Figure 6:
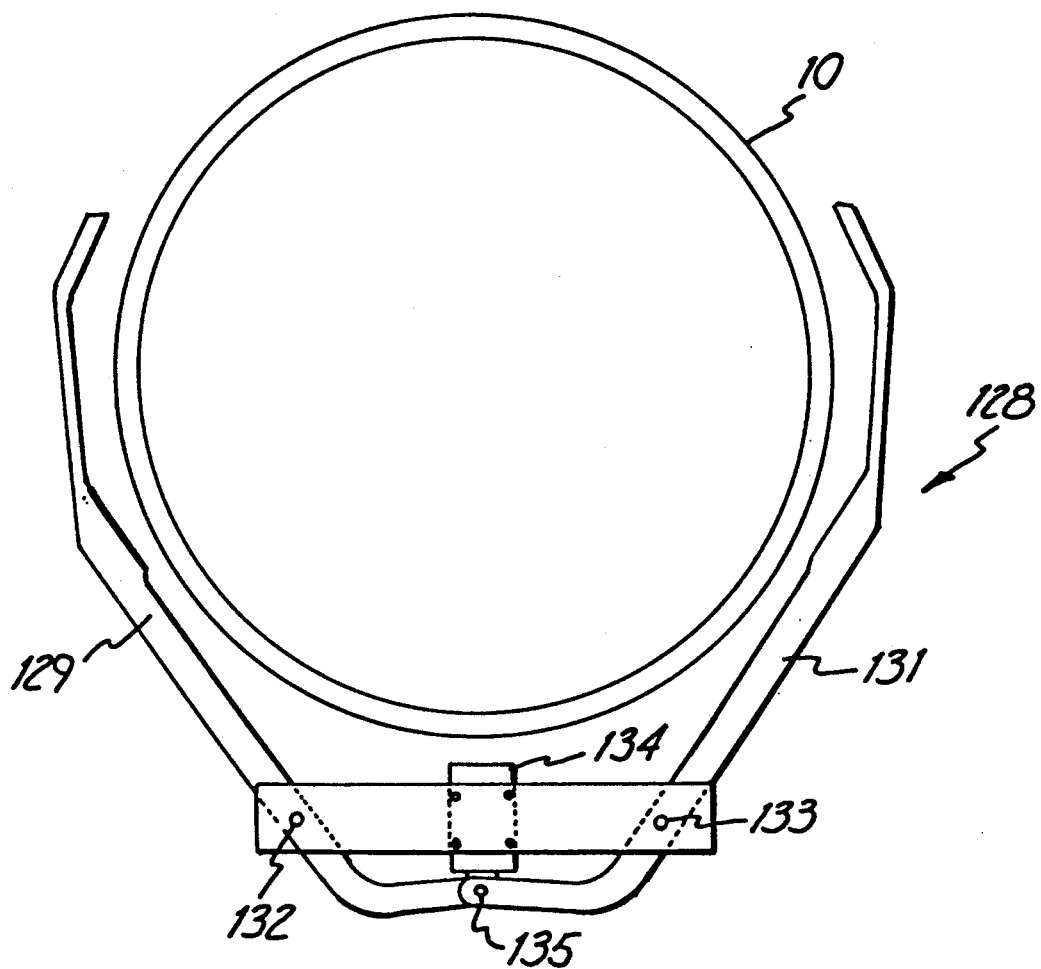
FIG. 6 is a caliper or clamp mechanism used to grip and carry the containers.

An alternate caliper is illustrated in FIG. 6. Caliper 128 may be constructed in a manner similar to caliper 28 including a pair of fingers 129 and 131 which are pivotally supported by pins 132 and 133. The caliper 128 includes a solenoid 134 which reciprocally drives to open and close the fingers 129 and 131. In this embodiment, a single pivot point is provided between fingers 128 and 131, namely pin 135.

The apparatus 20 (FIG. 3 and 5) may be driven by an electric motor 150 through a chain or belt 151 and suitable clutches 152.

Figure 7:
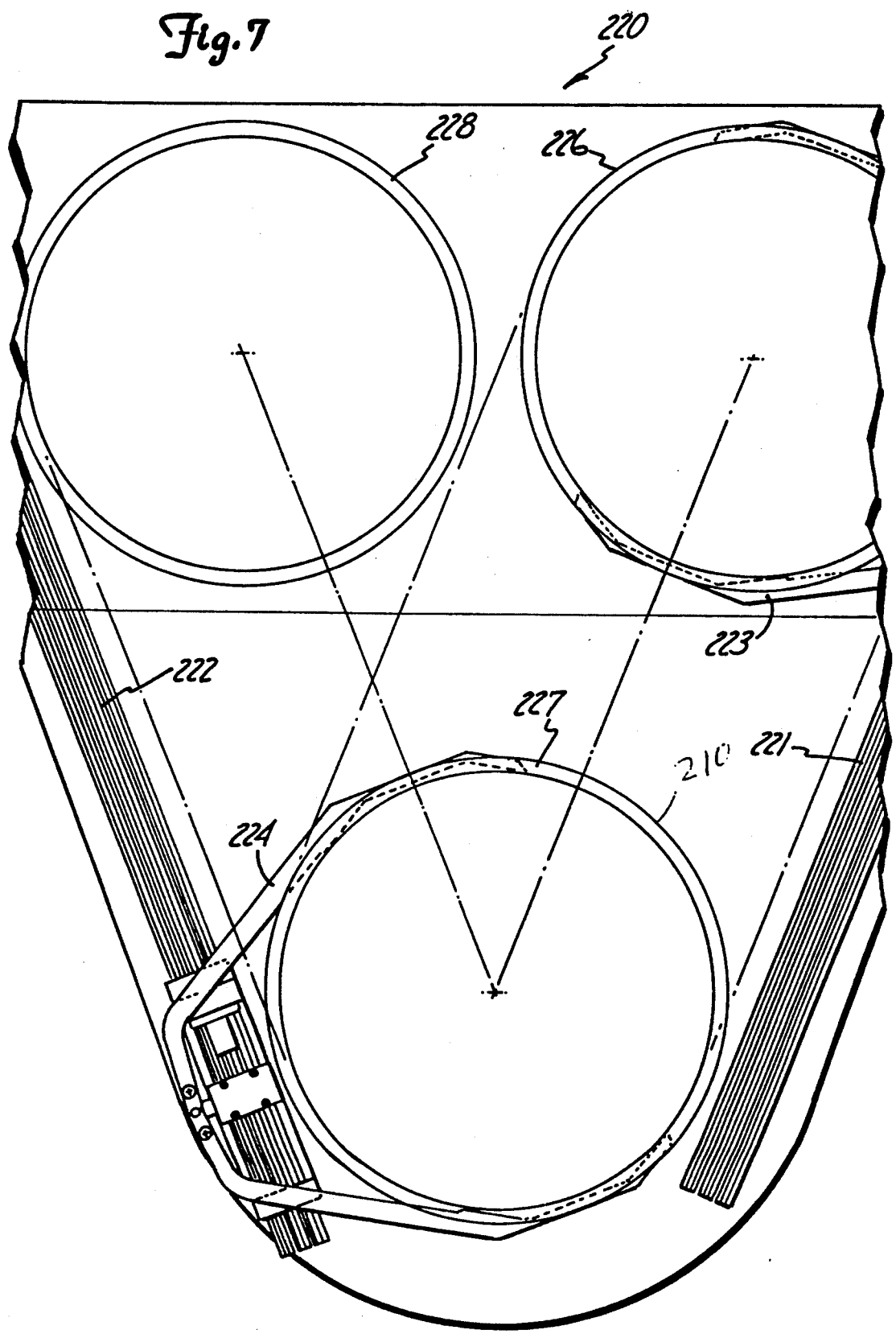
FIG. 7 is an alternate embodiment of the present invention in which the containers are linearly transported by screw mechanism.

An alternate linear transporting device 220 is shown in FIG. 7. Device 220 includes a pair of screws 221 and 222 which carry or transport the calipers 223 and 224 in a reciprocating manner. Caliper 223 picks up container 210 at station 226 and moves to the user station 227. Caliper 223 then withdraws. After the container is used, caliper 224 picks up the container 210 and moves it to station 228 where it is stacked and sealed. The calipers 223 and 224 may be mounted for elevational movement with respect to screws 221 and 222 to provide the necessary denesting and nesting or sealing.

While certain detailed embodiments are disclosed, it is to be recognized that various modifications may be made to the present invention without departing from the broader scope of the present invention. For example, a device may provide a two station arrangement in which the unused containers are in a first column, the container is denested and used. The used container is sealed and moved downwardly from such position.

What is claimed is:

1. A process for handling human fecal matter, said process comprising depositing the fecal matter in a container, and sealing an upper portion of the container wherein the container is sealed by moving the container upwardly to nest with a preceding container and developing a seal between the preceding container and the container.

2. Apparatus for handling human fecal matter, said apparatus comprising means or storing a plurality of stored unused container is a stacked relationship, means for withdrawing a single container from said stack, means for moving the single container from said stack, means for moving the single container to a position of use for receipt of fecal matter, and means for moving the container with fecal matter to a storage position, including means for sealing a used container, wherein the means for sealing includes means for nesting a container with a preceding container and sealing the preceding container and the container.

3. Apparatus for handling human fecal matter, said apparatus comprising means for storing a plurality of stored unused containers in a stacked relationship, means for withdrawing a single container from said stack, turntable mans for moving the single container to a position of use for receipt of fecal matter, and mans or moving the container with fecal matter to a storage position.

4. The apparatus of claim 3 wherein said apparatus includes a reciprocating needle operably coupled to a container for withdrawing fluid from the container following placement of the fecal matter in the container.

5. The apparatus of claim 4 wherein said reciprocating needle is adapted to redeposit a urine sample in a sample container for subsequent analysis.

6. The apparatus of claim 4 wherein said reciprocating needle is adapted to withdraw the fluid for discarding.

7. The apparatus of claim 3 wherein the apparatus includes air evacuation means for removing ambient air from around the container following depositing of the fecal matter in the container.

* * * * *

UNITED STATES PATENT AND TRADEMARK OFFICE
CERTIFICATE OF CORRECTION

PATENT NO. : 5,317,764
DATED : June 7, 1994
INVENTOR(S) : Joel A. Barker, et. al.

It is certified that error appears in the above-indentified patent and that said Letters Patent is hereby corrected as shown below:

```
Column 3, line 33, "caries" should be --carries--.
Column 3, line 61, "serve" should be --serves--.
Column 4, Claim 2, line 62, "or" should be --for--.
                  line 63, "container is" should be --containers in--
Column 5, Claim 3, line 9, "mans" should be --means--
Column 5, Claim 3, line 10, "mans or" should be --means for--
```

Signed and Sealed this

Thirtieth Day of August, 1994

Attest:

BRUCE LEHMAN

*Attesting Officer*     *Commissioner of Patents and Trademarks*